United States Patent
Suzuki

(10) Patent No.: US 7,227,852 B2
(45) Date of Patent: Jun. 5, 2007

(54) WIRELESS TRANSMISSION SYSTEM, WIRELESS TRANSMISSION METHOD, WIRELESS RECEPTION METHOD, TRANSMITTING APPARATUS AND RECEIVING APPARATUS

(75) Inventor: Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 1109 days.

(21) Appl. No.: 10/247,703

(22) Filed: Sep. 20, 2002

(65) Prior Publication Data

US 2003/0063597 A1    Apr. 3, 2003

(30) Foreign Application Priority Data

Sep. 21, 2001  (JP)  ............... 2001-290227

(51) Int. Cl.
*H04B 7/212*   (2006.01)
*H04J 3/00*    (2006.01)

(52) U.S. Cl. ............... 370/337; 370/347; 370/350

(58) Field of Classification Search ............... 370/328, 370/310, 329, 330, 337, 341, 347, 431, 442, 370/338, 349, 350, 503
See application file for complete search history.

(56) References Cited

U.S. PATENT DOCUMENTS

| | | | | | |
|---|---|---|---|---|---|
| 4,754,453 | A | * | 6/1988 | Eizenhofer | ............... 370/337 |
| 4,763,322 | A | * | 8/1988 | Eizenhofer | ............... 370/337 |
| 5,384,777 | A | * | 1/1995 | Ahmadi et al. | ............. 370/337 |
| 5,644,576 | A | * | 7/1997 | Bauchot et al. | ............. 370/437 |
| 7,027,415 | B1 | * | 4/2006 | Dahlby et al. | ............. 370/322 |
| 2001/0022791 | A1 | * | 9/2001 | Abdesselem et al. | ....... 370/510 |
| 2004/0240448 | A1 | * | 12/2004 | Quinquis et al. | ........ 370/395.1 |

* cited by examiner

*Primary Examiner*—Ajit Patel
(74) *Attorney, Agent, or Firm*—Oblon, Spivak, McClelland, Maier & Neustadt, P.C.

(57) ABSTRACT

A wireless transmission system is provided in a place where two or more wireless networks uncoordinated to each other are located and are subjected to receive mutual interference. This system can transmit data correctly with no limitation of the use of communication apparatus even if the transmission is subjected to the interference from the other network. Namely in an ultra wide band wireless transmission system, orders of the slots of a frame are replaced randomly by a predetermined slot permutation pattern, and then the replaced slots are transmitted. The orders of received slots are restored to the original order by the predetermined slot permutation pattern. Thereby, a diversity effect to interference can be obtained. Consequently, even if two or more networks uncoordinated to each other, in which the ultra wide band wireless transmission system operates, are located closely, communication in each network can be performed correctly.

17 Claims, 15 Drawing Sheets

WIRELESS TRANSMISSION SYSTEM, WIRELESS TRANSMISSION METHOD, WIRELESS RECEPTION METHOD, TRANSMITTING APPARATUS AND RECEIVING APPARATUS

BACKGROUND OF THE INVENTION

1. Field of the Invention

The present invention relates to a wireless transmission system, a wireless transmission method, a wireless reception method, a transmitting apparatus and a receiving apparatus.

2. Description of the Related Art

With the spread of a local area network (LAN) owing to computerization in recent years, a demand for a wireless LAN has risen owing to the problems of wiring construction in an office, the shortening of a construction period, a problem concerning an interior fine view, the complexity of maintenance, operation and management, and the like. As a wireless transmission system to be used for such a wireless LAN, the ultra wide band (UWB) wireless transmission system is known.

The ultra wide band wireless transmission system basically performs baseband transmission by the use of a signal composed of a pulse train having a very fine pulse width (for example, one nanosecond (ns) or shorter). The UWB wireless transmission system forms spread information by multiplying a prescribed wireless signal, for example transmission information, by a prescribed spread code sequence. Moreover, the UWB wireless transmission system generates a short impulse at the period of several hundreds nanoseconds, and uses a signal generated by changing the phase of the impulse or the time change of the impulse in accordance with the above-mentioned spread information as a transmission signal. On the other hand, an apparatus for receiving information discriminates an information bit of the impulse signal by means of the above-mentioned phase or the fine time change of the transmitted impulse. The apparatus for receiving information obtains a desired information bit by performing the reverse spread of the transmission signal by the use of a prescribed spread code sequence. Moreover, the occupied bandwidth of the UWB wireless transmission system is a bandwidth of the order of a gigahertz (GHz) such that a value obtained by dividing the occupied bandwidth by the center frequency thereof (for example, being within a range from 1 GHz to 10 GHz) becomes about 1. The bandwidth thereof is an ultra wideband in comparison with the bandwidths used in the so-called wideband code division multiple access (W-CDMA) system, the cdma2000 system and a wireless LAN using a spread spectrum (SS) or the orthogonal frequency division multiplex (OFDM).

Moreover, the ultra wide band transmission system has the feature in which the existing systems having a high signal power density characteristic at a specific frequency band is not easily subjected to interference owing to the low signal power density characteristic of the UWB system. Consequently, the UWB system is expected as a technique capable of overlaying the frequency bands used by the existing wireless systems. Moreover, because the USB system has a wide band, a hopeful view is taken on the USB system as a ultra high speed wireless transmission technique at a 100 Mbps level for the use of a personal area network (PAN).

On the other hand, if the case where two or more UWB wireless networks being uncoordinated with each other are existed in the same area is supposed in the UWB wireless transmission, it can be considered that the UWB wireless transmission may give large interference to each transmitter and receiver depending on their positional relationships. In such a case, because the UWB wireless transmission uses an ultra wideband in occupied bandwidth, there are no frequency channels for the escape of the interference. In the worst case, there is the apprehension that it becomes impossible to perform communication. Here, the expression "uncoordinated to each other" means that channel assignment information and the like are not shared by control stations that control individual network.

As one of means for solving the problem, the time division multiple access (TDMA) system is used in which a channel is divided into frames and resources are assigned to each frame.

The time division multiple access system performs continuous resource assignment over a comparatively long time in a frame to a single piece of communication in a network.

The conventional TDMA system adopts the following frame structure. An example of the frame structure is shown in FIGS. 13A and 13B.

In the TDMA system, as shown in FIG. 13A, for example, unit frames 1301, 1302 and 1303 of the TDMA system (called as "TDMA frames") are repeated. The length of each of the TDMA frames 1301, 1302 and 1303 is, for example, one microsecond.

In each of the TDMA frames 1301, 1302 and 1303, as shown in FIG. 13B, a beacon 1304 being an identifying signal including the assignment information of wireless resources (resource assignment information) is arranged at the head of the frame. Next to the beacon 1304, areas for terminal station (or users) included in the wireless network are assigned. In the example shown in FIG. 13B, areas (referred to as "user assignment areas") 1305, 1306 and 1307 which are assigned for a terminal station-A, a terminal station-B and a terminal station-C, respectively, are set in the order after the beacon 1304. The areas 1305, 1306 and 1307 which are assigned for each of the terminal stations-A, -B and -C may be variable in each frame.

Moreover, in an area other than the beacon 1304 and each of the user assignment areas 1305, 1306 and 1307, a contention period 1308 is set. The contention period 1308 is an area to be used for as a random access channel from a terminal station to a base station or communication between terminal stations. Because the contention period 1308 is not an interval assigned by the base station, contention of communication in the network can occur in the contention period 1308.

In communication using such a TDMA frame, for example, a terminal station demands resource assignment (a transmission demand) at the next frame in a random access channel (RACH) in the contention period 1308. Then, the base station determines user assignment areas for the resource assignment in the next frame in response to the demand. Furthermore, the base station informs the determination to each of the terminal stations-A, -B and -C by means of a beacon 1309 in the next frame. Then, each of the terminal stations-A, -B and -C performs communication on the basis of the resource assignment information of the beacon 1309.

If two or more uncoordinated UWB networks performing communication using the TDMA frames are arranged closely to each other, the interference to stations in the network easily occur continuously. In such a case, there is the problem in which the station having received the interference cannot restore data by error correction or the like, and the communication becomes impossible.

FIG. 14 shows a state in which two networks are arranged closely to each other. As shown in FIG. 14, a personal area network (hereinafter referred to as a "PAN")-X 1401 and a PAN-Y 1402 are arranged closely to each other in an uncoordinated state to each other. The PAN-X 1401 is composed of a base station-X 1403, a terminal station-A 1405, a terminal station-B 1406, a terminal station-C 1407 and a terminal station-F 1410, wherein all of the terminal stations-A 1405, -B 1406, -C 1407 and -F 1410 are controlled by the base station-X 1403. On the other hand, the PAN-Y 1402 is composed of a base station-Y 1404, a terminal station-D 1408 and a terminal station-E 1409, wherein both of the terminal stations-D 1408 and -E 1409 are controlled by the base station-Y 1404.

Moreover, the terminal station-C 1407 and the terminal station-E 1409 are at a positional relationship in which, if either of the terminal stations-C 1407 and -E 1409 performs wireless transmission, the wireless transmission interferes with a wireless signal received by the other.

FIGS. 15A and 15B show the states of the frames of the PAN-X 1401 and the PAN-Y 1402, respectively. FIG. 15A shows the state of a frame of the PAN-X 1401 at a certain point of time, and FIG. 15B shows a frame of the PAN-Y 1402 at the same point of time.

As shown in FIGS. 15A and 15B, a user assignment area 1501 assigned to the terminal station-F 1410 (the communication from the terminal station-F 1410 to the terminal station-C 1407 is supposed) and a user assignment area 1502 assigned for the transmission of the terminal station-E 1409 are in the state of overlapping in time with each other. As shown in FIGS. 15A and 15B, in the case where the user assignment areas to which the terminal station-C 1407 belonging to the PAN-X 1401 and the terminal station-E 1409 belonging to another PAN-Y 1402, both of the terminal stations-C 1407 and -E 1409 being located closely to each other, are assigned are in contention with each other, it is apprehended that the communication between the terminal stations-F 1410 and -C 1407 becomes impossible.

Consequently, it was necessary to impose some limitations on using communication apparatus constituting each network for avoiding the above-mentioned situation. For example, it was necessary to avoid such a situation in which two or more networks being uncoordinated to each other are located in the same area.

SUMMARY OF THE INVENTION

There is a need for providing a wireless transmission system which has no necessity of imposing any limitation on using communication apparatus even if two or more wireless networks being uncoordinated to each other are located at positions where the wireless networks interfere with each other and can correctly transmit data even if the other network interferes with communication.

As means for solving the above-mentioned problem, the present invention has the following features.

A first aspect of the present invention is a wireless communication system for performing wireless communication by use of a time-division frame having a prescribed period in each network among existing two or more networks being uncoordinated to each other, wherein: the time-division frame is composed of a plurality of fragmented slots; and each wireless communication apparatus permutates the fragmented slots corresponding to areas assigned by a base station for performing transmission in an order in accordance with a prescribed slot permutation pattern, and performs wireless transmission by-use of the permutated fragmented slots.

A second aspect of the invention is a wireless communication system wherein the slot permutation pattern is made for permutating the fragmented slots randomly in a whole area of the time-division frame.

A third aspect of the invention is a wireless communication system wherein: a number of the fragmented slots corresponding to the areas assigned by the base station is N; and the slot permutation pattern is made for permutating each fragmented slot by grouping the N fragmented slots at every J continuous fragmented slots to N/J groups, and by allotting the fragmented slots one by one from each group to J slot groups.

A fourth aspect of the invention is a wireless communication system wherein: the time-division frame includes a contention period; and when each wireless communication apparatus performs wireless communication by use of the contention period, a plurality of continuous fragmented slots are assigned as a transmission area, and then the plurality of continuous fragmented slots are permutated in an order in accordance with the prescribed slot permutation pattern.

A fifth aspect of the invention is a wireless communication system wherein there are a plurality of synchronous slots including a prescribed synchronous pattern for obtaining synchronization of the slot permutation pattern in the time-division frame.

A sixth aspect of the invention is a wireless communication system wherein the prescribed synchronous pattern has a length same as lengths of the synchronous slots.

A seventh aspect of the invention is a wireless communication system wherein: the prescribed synchronous pattern has a length shorter than lengths of the synchronous slots; and the synchronous slots are composed of repetitions of the prescribed synchronous pattern.

A eighth aspect of the invention is a wireless communication system wherein: lengths of the synchronous slots are not integer multiple of a length of the synchronous pattern; and window synchronization words fetched from repeatedly generated patterns for synchronization by means of the synchronous slots as windows are transmitted as the synchronous slots.

A ninth aspect of the invention is a transmitting apparatus for performing wireless communication by use of a time-division frame having a prescribed period in a circumstance where two or more networks exist with being uncoordinated to each other, the time-division frame being composed of a plurality of fragmented slots, the transmitting apparatus comprising: slot permutation controlling means for controlling the fragmented slots corresponding to areas assigned by a base station for performing transmission to be permuted in an order in accordance with a prescribed slot permutation pattern; slot permutating means for permutating the fragmented slots by being controlled by the slot permutation controlling means; transmission timing controlling means for controlling transmitting means to transmit the permutated fragmented slots at timing in accordance with the prescribed slot permutation pattern; and transmitting means for performing the wireless communication at timing controlled by the transmission timing controlling means.

A tenth aspect of the invention is a receiving apparatus for performing wireless communication by use of a time-division frame having a prescribed period in a circumstance where two or more networks exist with being uncoordinated to each other, the receiving apparatus comprising: receiving means for receiving a wireless signal to demodulate the received wireless signal; reception timing controlling means for controlling the receiving means to demodulate parts corresponding to necessary fragmented slots in received wireless signal at prescribed timing by use of a slot permutation pattern used by a transmitting apparatus; slot permutation controlling means for controlling to de-permutate the fragmented slots in accordance with the slot permutation pattern used by the transmitting apparatus; and slot permutating means for permutating the fragmented slots by being controlled by the slot permutation controlling means.

An eleventh aspect of the invention is a receiving apparatus further comprising correlation detecting means for detecting a prescribed synchronous pattern for obtaining synchronization of the slot permutation pattern.

A twelfth aspect of the invention is a receiving apparatus further comprising error correcting means for correcting an error of reception data de-permutated by the slot permutating means.

A thirteenth aspect of the invention is a wireless transmission method for performing wireless communication by use of a time-division frame having a prescribed period in a circumstance where two or more networks exist with being uncoordinated to each other, the time-division frame being composed of a plurality of fragmented slots, the wireless transmission method comprising the steps of: permutating the fragmented slots corresponding to areas assigned by a base station for performing transmission in an order in accordance with a prescribed slot permutation pattern; and transmitting the permutated fragmented slots at timing in accordance with the prescribed slot permutation pattern.

A fourteenth aspect of the invention is a wireless reception method for performing wireless communication by use of a time-division frame having a prescribed period in a circumstance where two or more networks exist with being uncoordinated to each other, the wireless reception method comprising the steps of: receiving a wireless signal at timing in accordance with a prescribed slot permutation pattern; and de-permutating fragmented slots in accordance with a slot permutation pattern used by a transmitting apparatus.

Even if two or more wireless networks uncoordinated to each other are located at positions where the wireless networks are subjected to mutual interference, some slots are subjected to the interference, and the other slots are not subjected to the interference. The slots subjected to the interference can be transmitted correctly by error correction using their de-interleaving and coding.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Next, the accompanying drawings are referred while a preferred embodiment of the present invention is described.

[Constructional Example of Frame According to the Present Embodiment]

First, a constructional example of a frame to be used in the present embodiment is described.

Figure 1:
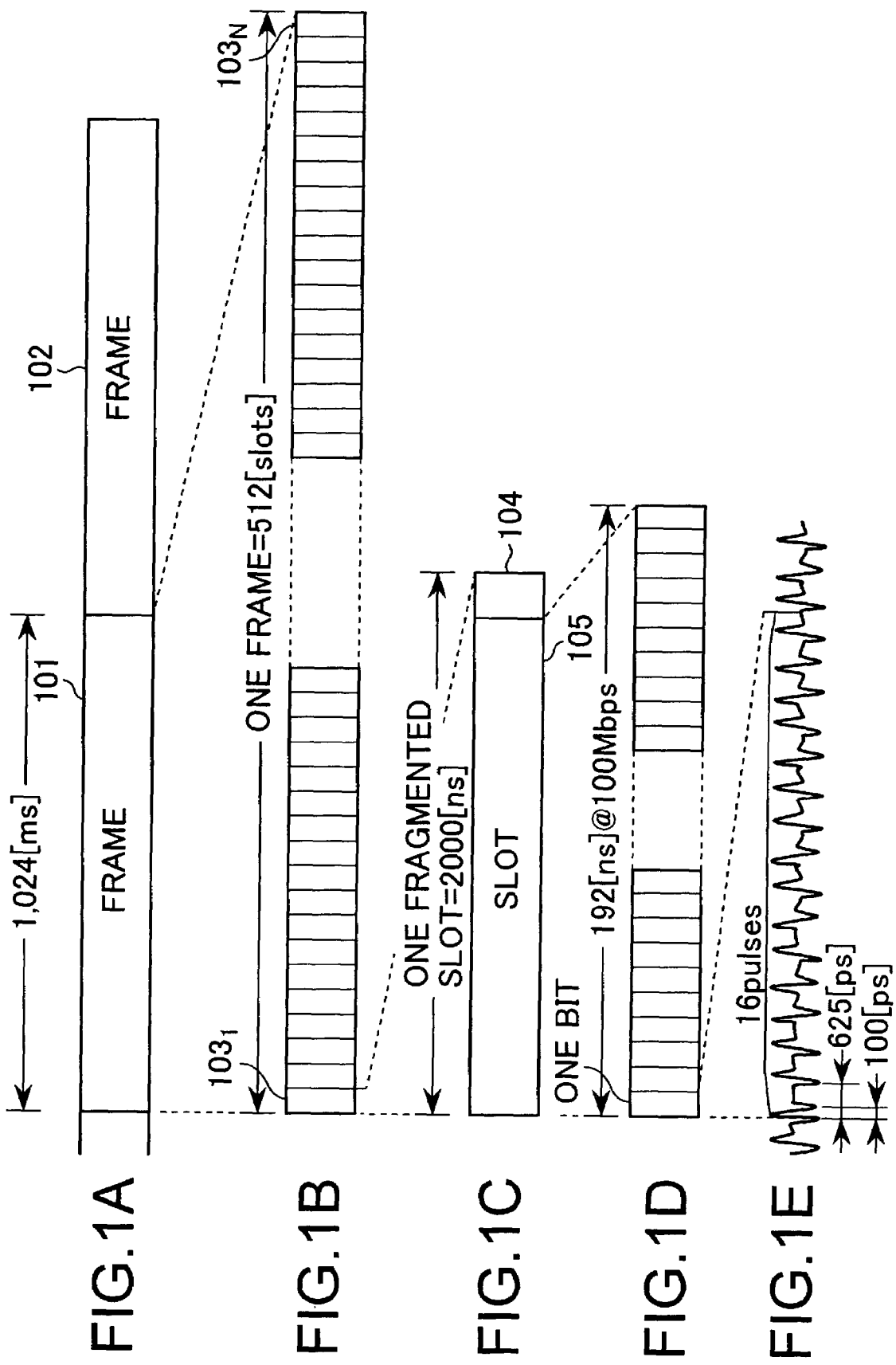
FIG. 1A is a diagram showing frames having prescribed lengths.
FIG. 1B is a diagram showing a state of one frame being divided into N slots.
FIG. 1C is a diagram showing the structure of a slot.
FIG. 1D is a diagram showing information bits included in a slot.
FIG. 1E is a diagram showing an example of a pulse train of a bit.

FIG. 1A shows frames 101, 102, to be repeated which has prescribed lengths. For example, a one frame is supposed to have the length of 1024 [ms] in the example shown in FIG. 1A.

The frame 101 is composed of N fragmented slots $103_1$–$103_N$ (hereinafter generically referred to as "fragmented slots 103"). In the example shown in FIG. 1B, the frame 101 is composed of 512 fragmented slots 103. In this case, the slot length of each fragmented slot 103 is 1024 [ms]/512=2000 [ns].

Next, the structure of the fragmented slot 103 is described. FIG. 1C shows a constructional example of the fragmented slot 103 according to the present embodiment. A part of the fragmented slot 103 is used to be an area not including any transmission signal as a guard period 104. The guard period 104 is formed for preventing the contention of transmission signals transmitted from each of the continuing fragmented slots 103 even if the transmission signals arrives at a certain receiver after different propagation delays in the case where the fragmented slots 103 are used by different transmitting apparatus.

A residual area 105 in the fragmented slot 103 other than the guard period 104 is an area containing transmission signals. In the example shown in FIG. 1C, the length of the guard period 104 is 80 [ns], and the length of the area 105 is 1920 [ns].

Information bits are contained in the area 105. When the transmission speed of the bits is, for example, 100 [Mbps], 100 [Mbps]×1920 [ns]=192 [bits] are included in one fragmented slot.

In particular, in the conventional UWB transmission system, one bit is expressed by 16 pulses (having the pulse width of 100 [ps], severally). In an example shown in FIG. 1E, a pulse train formed by the modulation in conformity with the Bi-phase modulation which inverts the phases of pluses in accordance with "0" or "1" of spread codes directly is transmitted at every pulse interval of 625 [ps].

Incidentally, although definite numerical values are adopted to give the above descriptions as examples, the adoption of the definite numerical values does not mean that the scope of the present invention is limited to the definite numerical values. Moreover, the modulation system of the UWB transmission system may be the so-called pulse position modulation using a signal in which pulse generation timing is shifted delicately.

[Constructional Examples of Transmitting Apparatus and Receiving Apparatus]

Next, a description is given to constructional examples of a transmitting apparatus and a receiving apparatus for implementing a wireless transmission system using the above-mentioned frames each composed of a plurality of fragmented slots.

Figure 2:
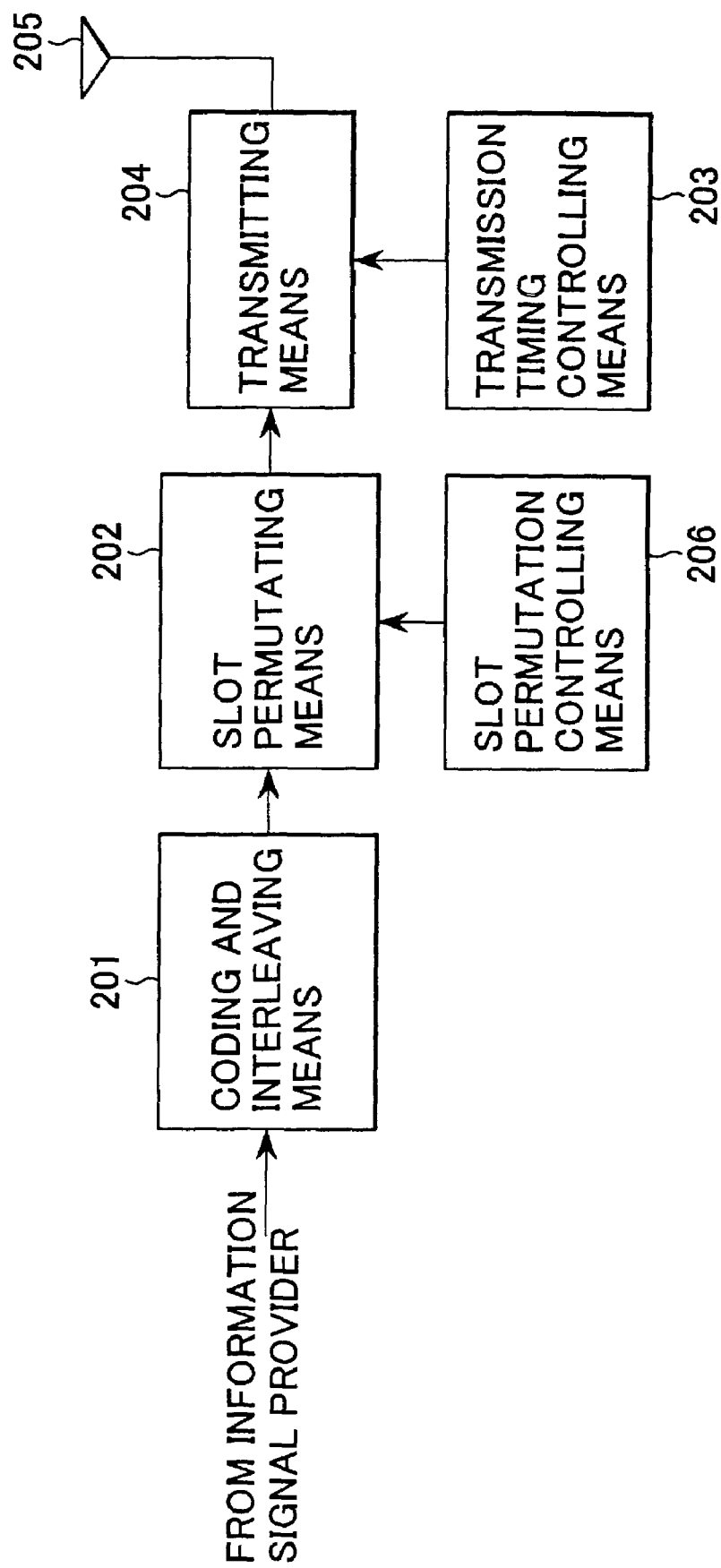
FIG. 2 is a block diagram showing a constructional example of a transmitting apparatus of an embodiment.

FIG. 2 is a block diagram showing a constructional example of a transmitting apparatus according to the present embodiment. The transmitting apparatus includes coding and interleaving means 201, slot permutating means 202, transmission timing controlling means 203, transmitting means 204, an antenna 205 and a slot permutation controlling means 206. Incidentally, the coding and interleaving means 201, the slot permutating means 202, and the transmission timing controlling means 203 may practically be structured by means of a central processing unit (CPU). The CPU executes the following processing in accordance with a program stored in a storage device (e.g. an electrically erasable programmable read-only memory (EEPROM) or the like, but not shown here).

The coding and interleaving means 201 operates as follows. That is, the coding and interleaving means 201 receives information data from an provider of information to be transmitted, and executes the coding of the received information data by the use of an error correcting code. Moreover, the coding and interleaving means 201 interleaves the coded information data in order to obtain the effect of a convolutional code by substituting burst errors with random errors. Then, the coding and interleaving means 201 transfers thus obtained interleaved coded data to the slot permutating means 202.

Figure 7:
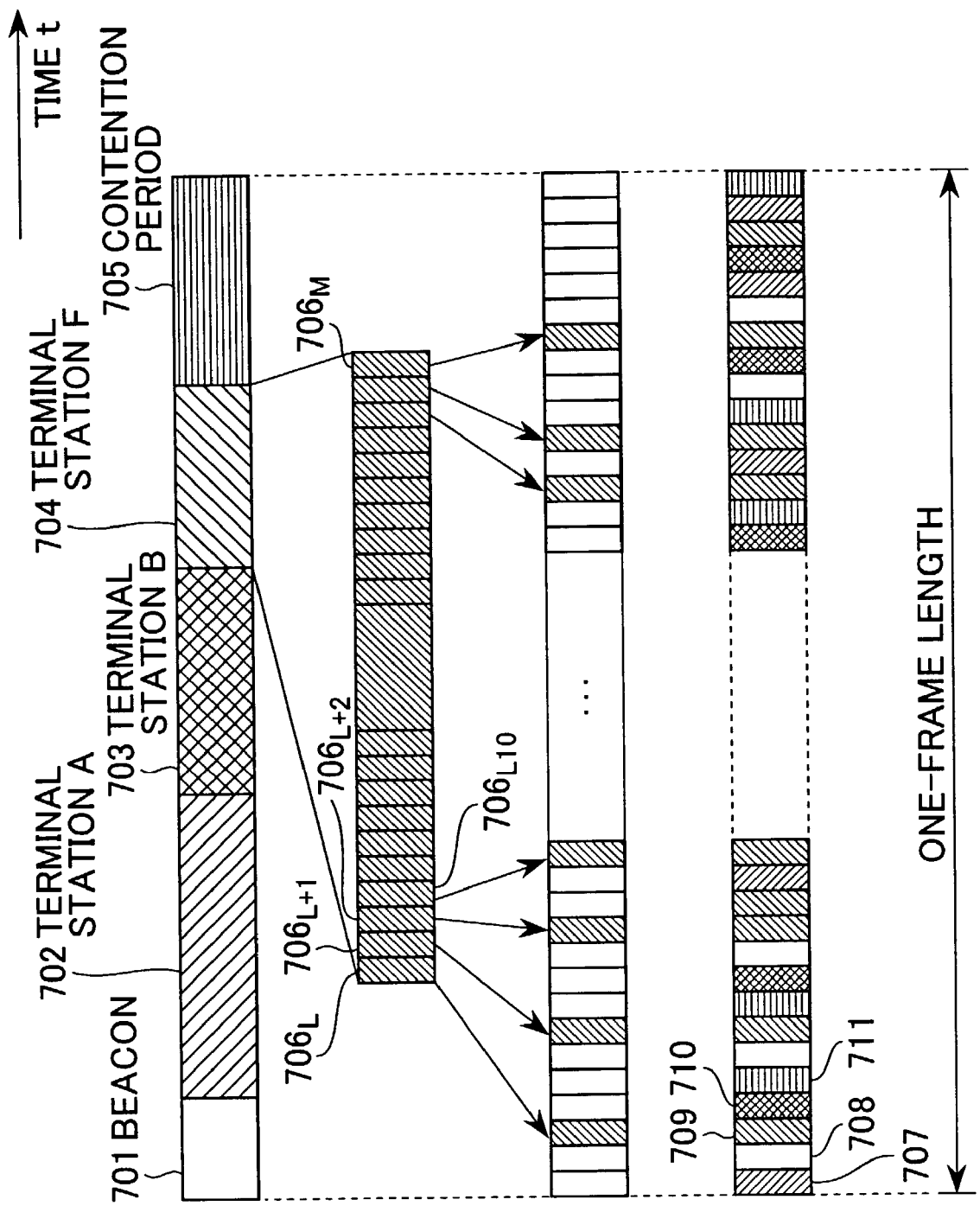
FIG. 7A is a diagram showing a resource assignment state of a frame of the embodiment.
FIG. 7B is a diagram showing the slotting of a user assignment area 704.
FIG. 7C is a diagram showing a state of the frame in which slotted data of the user assignment area 704 are arranged according to a slot permutation pattern.
FIG. 7D is a diagram showing a state of the frame in which all of the slots are arranged according to the slot permutation pattern.

The slot permutating means 202 operates to permutate or rearrange a plurality of fragmented slots included in a channel assigned by the base station (time division slots allocated to each terminal as shown in FIG. 7A, for example) for executing transmission by dividing them in a form having the slot lengths, in accordance with a prescribed slot permutation pattern by the control of the slot permutation controlling means 206.

Now, it is supposed that the information bits to be transmitted exist in the slots corresponding to slot numbers 3, 4, 5 and 6. Incidentally, it is also supposed that the slot numbers are continuously numbered from 1 for the first slot in a frame to N for the last slot in the frame for the convenience of description.

If a prescribed permutation pattern is supposed to permutate the slots having slot numbers of 3, 4, 5 and 6 at the slots having slot numbers 44, 11, 79 and 58, respectively, by the control of the slot permutation controlling means 206, the slotted data assigned to the four slots are permutated in the order of {4(11), 3(44), 6(58), 5(79)}. Incidentally, the figures in the parentheses indicate slot numbers after the permutation.

The transmission timing controlling means 203 operates to make the transmitting means 204 transmit the permutated slotted data at the timing in accordance with the prescribed slot permutation pattern.

According to the above-mentioned example, the transmission timing controlling means 203 makes the transmitting means 204 transmit the slotted data corresponding to the slot numbers 4, 3, 6 and 5 at the timing of 11, 44, 58 and 79, respectively. Incidentally, the slot permutation method will be described in detail later.

Figure 3:
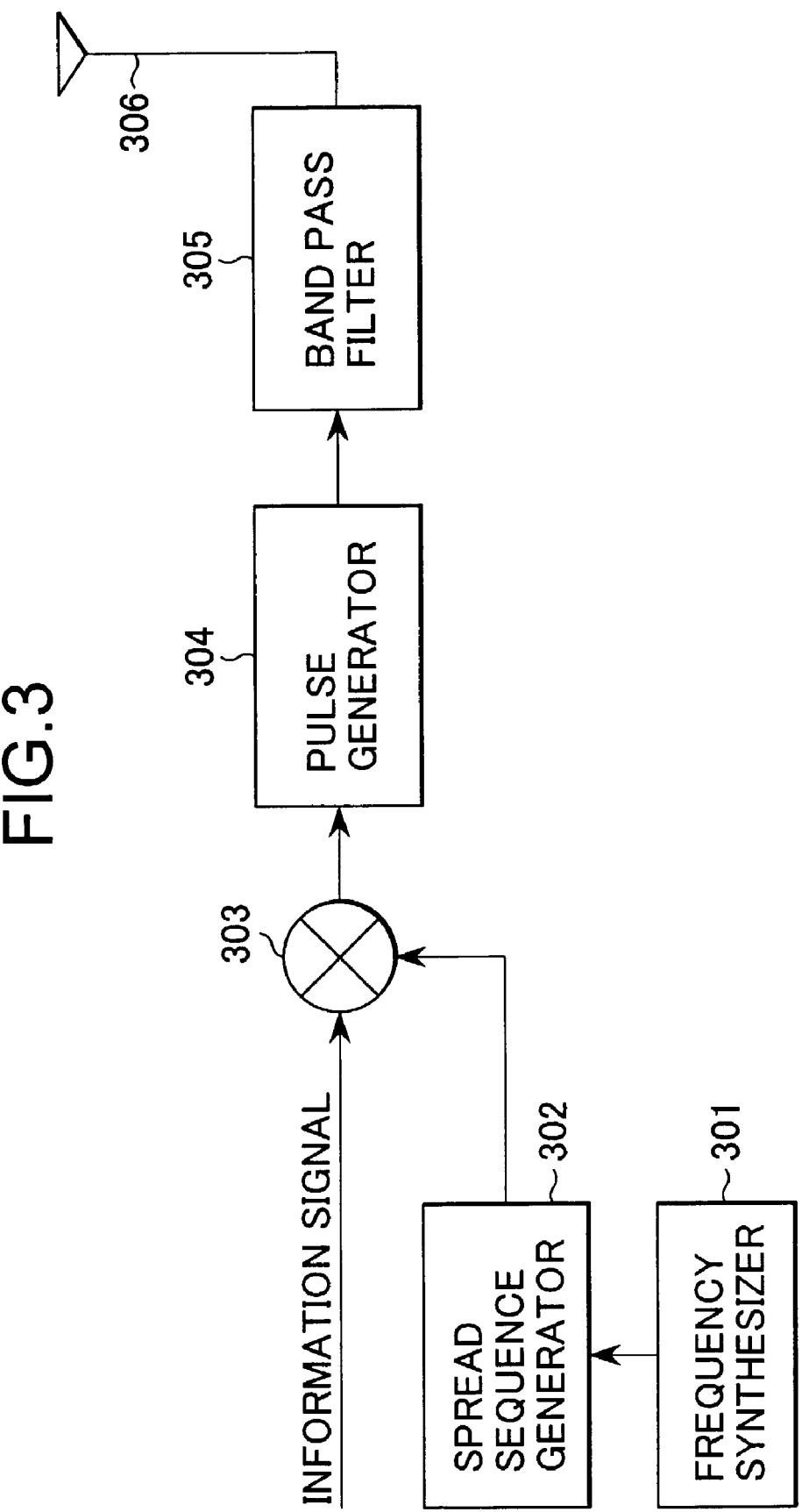
FIG. 3 is a block diagram showing a constructional example of transmitting means of the transmitting apparatus.

The transmitting means 204 operate to convert data to a wireless signal by the UWB transmission system at the transmission timing received from the transmission timing controlling means 203 and to radiate the converted data from the antenna 205. FIG. 3 is a block diagram showing a constructional example of the transmitting means using the ultra wide band transmission system. FIG. 3 shows the transmitting means 204 and the antenna 205 shown in FIG. 2 more precisely.

A spread sequence generator 302 outputs a spread code sequence to a multiplier 303 at the frequency of a frequency synthesizer 301. The multiplier 303 multiplies slotted data by the spread code sequence to make a spread signal, and this spread signal is output to a pulse generator 304.

The pulse generator 304 generates a very fine pulse signal having a pulse width of, for example, 100 ps according to the state of "0" or "1" of the spread signal. The pulse signal is output to a band pass filter 305, and unnecessary components are removed by the band pass filter 305. The output signal of the band pass filter 305 then becomes a transmission signal to be transmitted through the antenna 306 corresponding to the antenna 205 in FIG. 2). Incidentally, the band pass filter 305 is not an essential component.

[Constructional Example of Receiving Apparatus]

Next, a constructional example of a receiving apparatus according to the present embodiment is described.

Figure 4:
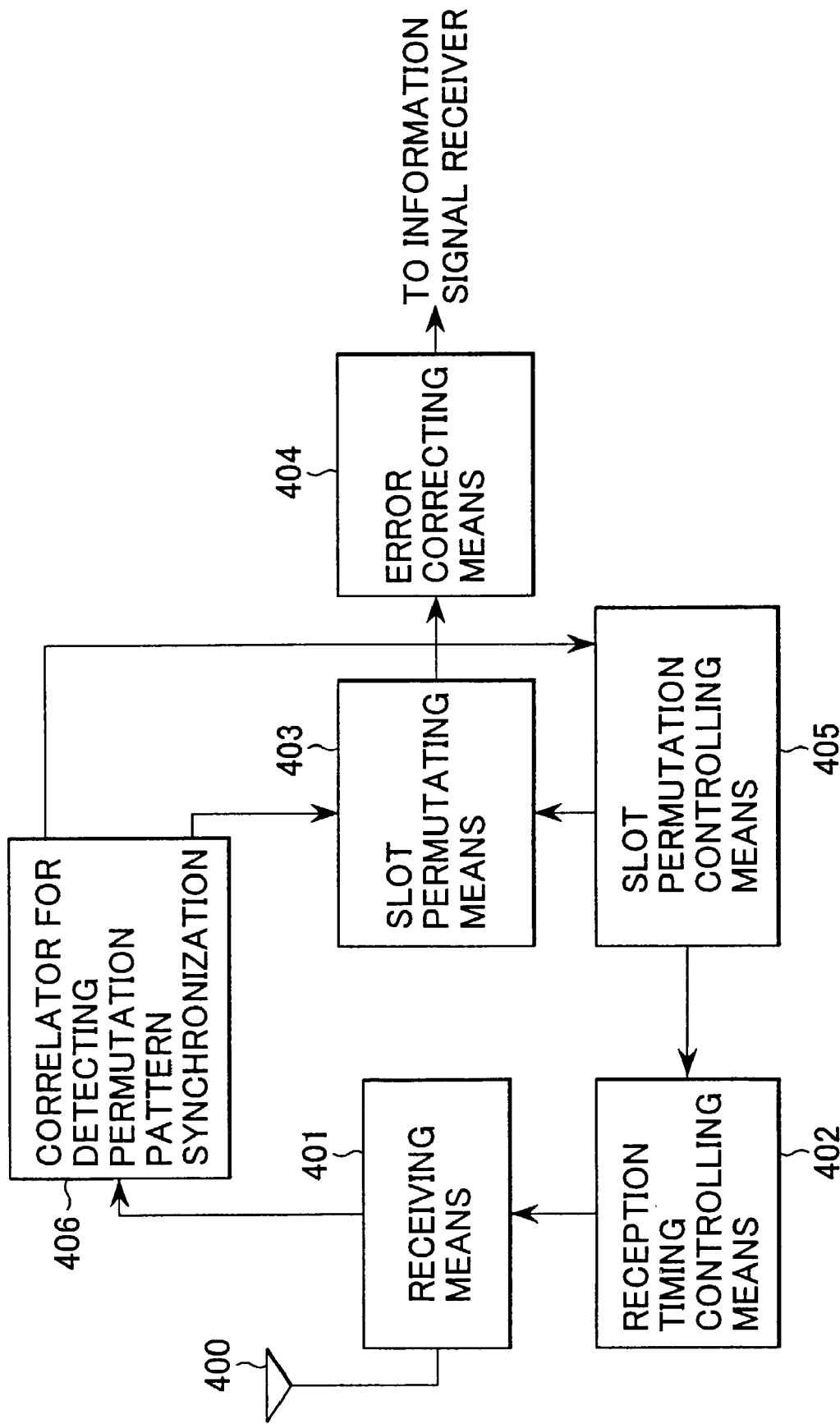
FIG. 4 is a block diagram showing a constructional example of a receiving apparatus of the embodiment.

FIG. 4 is a block diagram showing a constructional example of a receiving apparatus according to the present embodiment. The receiving apparatus is composed of an antenna 400, receiving means 401, reception timing controlling means 402, slot permutating means 403, a slot permutation controlling means 405, a correlator for detecting permutation pattern synchronization 406, and error correcting means 404. Incidentally, practically, the reception timing controlling means 402, the slot permutating means 403, the slot permutation controlling means 405 and the error correcting means 404 may be structured by a central processing unit (CPU). The CPU functions as the reception timing controlling means 402, the slot permutating means 403, the slot permutating controlling means 405 and the error correcting means 404 by executing the following processing in conformity with a program stored in a storage device (e.g. an electrically erasable programmable read-only memory (EEPROM) or the like, but not shown here).

Figure 5:
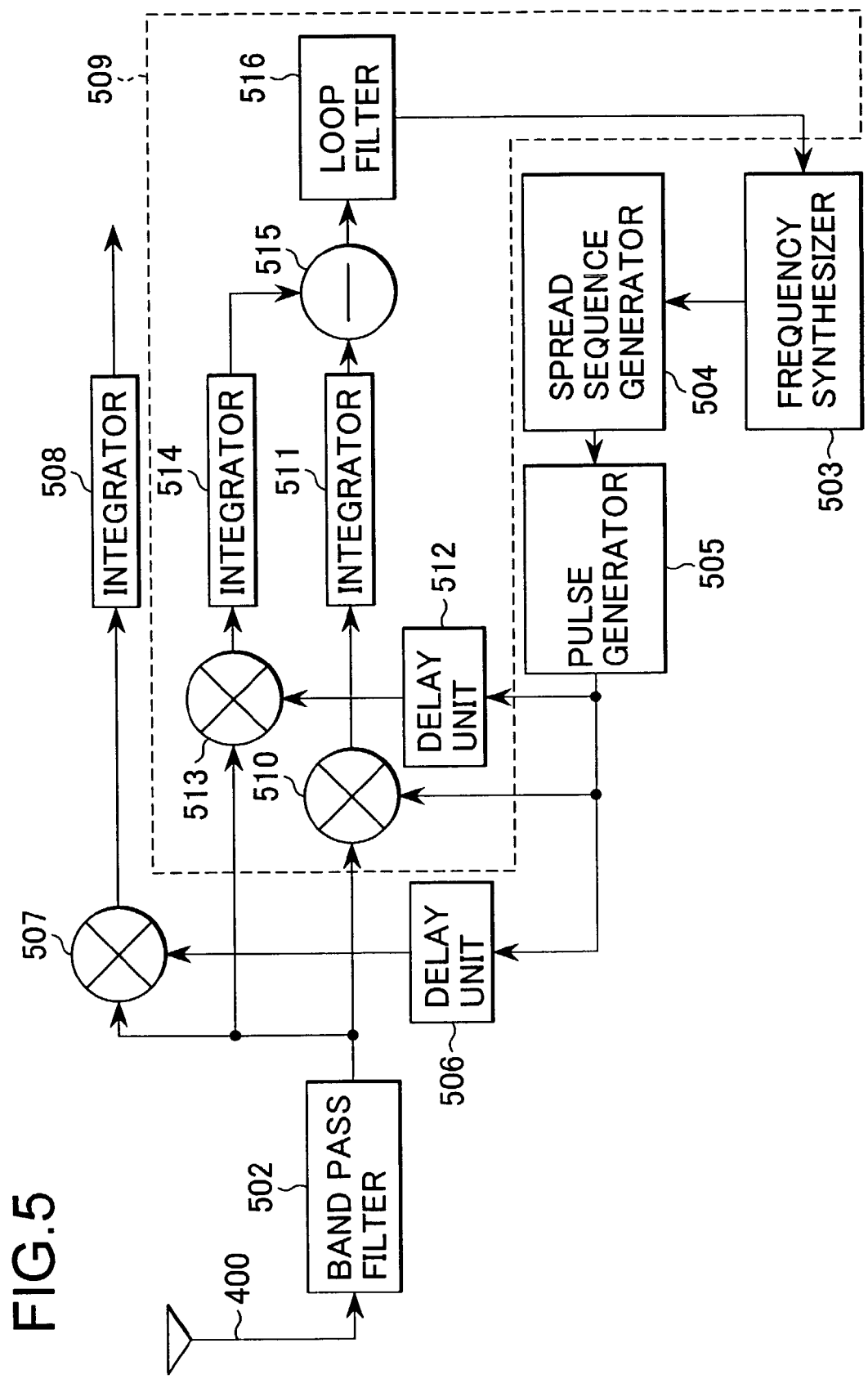
FIG. 5 is a block diagram showing a constructional example of receiving means of the receiving apparatus.

The receiving means 401 operates to receive a wireless signal transmitted from the transmitting apparatus through the antenna 400. And the receiving means 401 operates to demodulate the received wireless signal and to output reception data. FIG. 5 is a block diagram showing a constructional example of the receiving means 401 which receives an ultra wide band signal. The unnecessary components of a reception signal received through the antenna 400 are removed by a band pass filter 502, and then the reception signal is output to multipliers 507, 513 and 510. Incidentally, the band pass filter 502 is not an essential component.

A spread sequence generator 504 outputs a spread code sequence (the same spread code sequence as that used by the transmitting apparatus shown in FIG. 3) to a pulse generator 505 at the frequency of a frequency synthesizer 503. The pulse generator 505 generates a pulse, and superposes the spread code sequence output by the spread sequence generator 504 on the pulse to output to delay units 506 and 512 and the multiplier 510.

The delay unit 506 delays the pulse on which the spread code sequence is superposed by a half pulse width and outputs the delayed pulse to the multiplier 507. Moreover, the delay unit 512 delays the pulse on which the spread code sequence is superposed by one pulse width and outputs the delayed pulse to the multiplier 513.

Consequently, the multiplier 507 multiplies the reception signal by the pulse on which the spread code sequence is superposed for demodulating transmission data to execute reverse spread processing. The multiplication result of the multiplier 507 is output to an integrator 508, and is integrated by the integrator 508 to be output as reception data.

Moreover, the multiplier 510 multiplies the reception signal by the pulse on which the spread code sequence is superposed at the timing preceding to the output of the delay unit 506 by a half pulse width and executes the reverse spread processing. Moreover, the multiplier 513 multiplies the reception signal by the spread code sequence delayed from the output of the delay unit 506 by a half pulse width and executes the reverse spread processing.

The multiplication result of the multiplier 510 is output to the integrator 511 and is integrated by the integrator 511 to be output to a differential device 515. The multiplication result of the multiplier 513 is output into an integrator 514 to be integrated by the integrator 514 and is output to the differential device 515.

The differential device 515 obtains the difference between the output of the integrator 511 and the output of the integrator 514 and outputs the difference to a loop filter 516. The output (difference) of the filtering of the difference by the loop filter 516 is fed back to the frequency synthesizer 503 to achieve the synchronization of the timing for receiving an ultra wide band signal. If the offset of the reception timing is shifted before or after, a positive or a negative value is output as a timing offset signal. A reference numeral 509 designates a timing synchronous circuit (delay lock loop (DLL)) performing such timing synchronization.

The description of the constructional example of the receiving apparatus is continued by returning to FIG. 4 again.

The reception timing controlling means 402 controls the receiving means 401 to receive the part of the reception signal corresponding to necessary fragmented slots at the prescribed timing by the use of the permutation pattern used by the transmitting apparatus. For example, in the example cited in the description about the transmitting apparatus above in which the slotted data corresponding to the slot numbers of 4, 3, 6 and 5 are transmitted at the timing of the slot numbers of 11, 44, 58 and 79, respectively, by the transmitting means, the reception timing controlling means 402 controls the receiving means 401 to receive them at the timing of 11, 44, 58 and 79. The slot permutation controlling means 405 controls to demodulate the parts corresponding to the fragmented slots of the slot numbers 11, 44, 58 and 79 with reference to the afore mentioned permutation pattern.

At the initial state of a terminal (at the time immediately after the turning on of a power supply, or the like), it is necessary to secure the synchronization of the permutation pattern. Consequently, the correlator 406 becomes necessary. The detailed description of the operation of the correlator 406 will be given later.

The slot permutating means 403 receives the reception data output from the receiving means 401. The slot permutating means 403 de-permutates the reception data to be the original order in conformity with the control of the slot permutation controlling means 405. For example, in the above-mentioned example, because the slotted data received by the slot permutating means 403 is in the order of the slot numbers 4, 3, 6 and 5, the slot permutating means 403 de-permutates the slotted data in the original order of the slot numbers 3, 4, 5 and 6.

The error correcting means 404 first de-interleaves the de-permutated slotted data, and after that the error correcting means 404 corrects the errors of the slotted data. Thereby, the error correcting means 404 generates information bits to output them.

By the adoption of the above-mentioned structure, the receiving apparatus can recover the information bits transmitted from the above-mentioned transmitting apparatus.

[Operation of Transmitting Apparatus and Receiving Apparatus]

Next, the operation of the transmitting apparatus and the receiving apparatus according to the present embodiment is described. First, the transmitting apparatus executes the coding of the information bits corresponding to one frame period with the coding means 201. Moreover, the coded information bits are interleaved by the coding means 201, and the interleaved information bits for one slot are collected severally as slotted data.

After that, the transmitting apparatus makes the transmitting means 204 transmit the slotted data at the timing determined in conformity with the slot permutation pattern previously determined by the transmission timing controlling means 203.

The wireless signal transmitted from the transmitting apparatus is disturbed by interference waves and the like in transmission lines and reaches the receiving apparatus as a reception signal.

In the receiving apparatus, the reception timing controlling means 402 controls the receiving means 401 to receives necessary slot parts of the reception signal according to the previously determined slot permutation pattern (the same pattern as that used by the transmitting apparatus).

The receiving means 401, the timing of which is controlled by the reception timing controlling means 402, outputs permutated slotted data. The permutated slotted data are de-permutated by the slot permutating means 403 according to the slot permutation pattern.

The de-interleave and the error correction of the slotted data de-permutated by the slot permutating means 403 are performed by the error correcting means 404, and then the information bits can be obtained. Thereby, the receiving apparatus can obtain the information bits transmitted from the transmitting apparatus.

[Operation Example of Wireless Network According to Present Embodiment]

Figure 6:
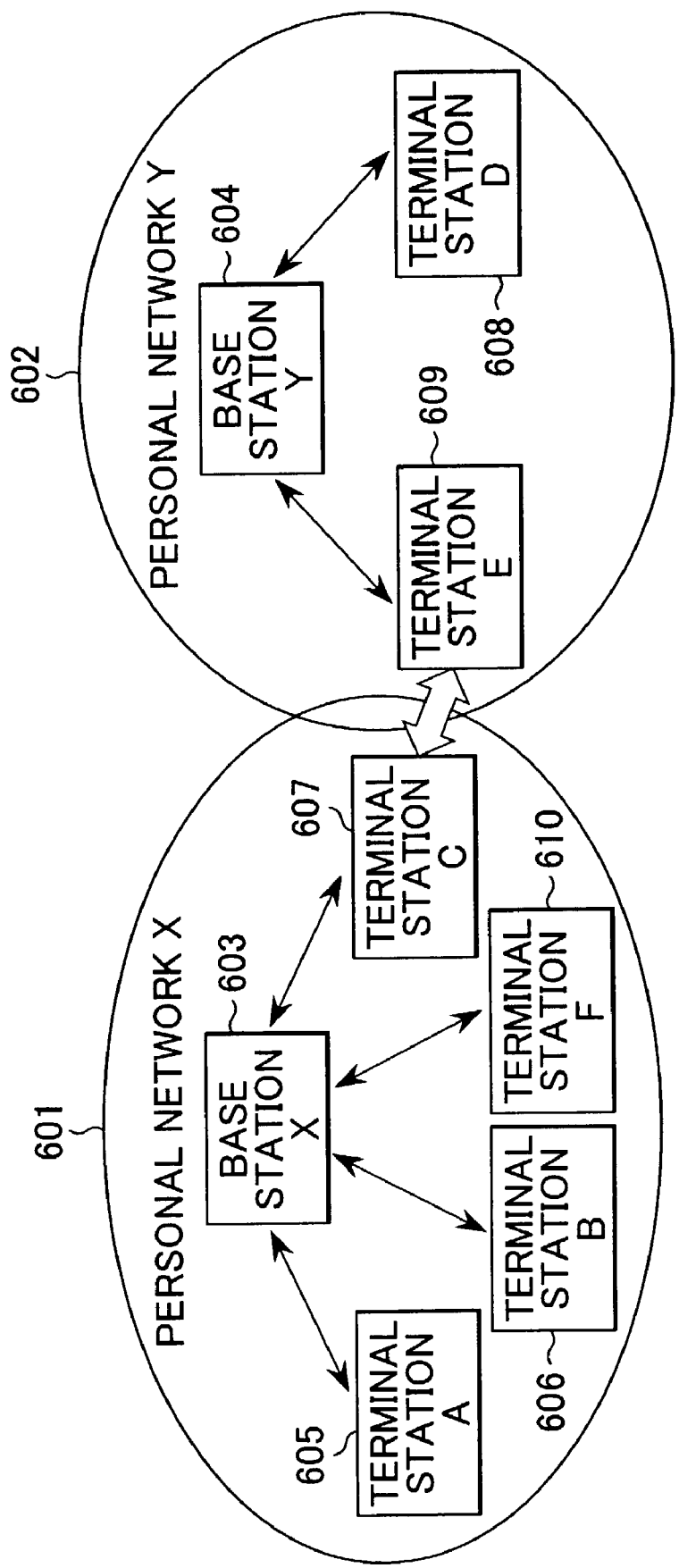
FIG. 6 is a diagram showing the constructions of two wireless networks.

Next, an operation example of the wireless network according to the present embodiment is described. The random slot assign method and how to handle an interference wave by the random slot assign method are described. FIG. 6 is a diagram showing two or more networks are arranged closely to each other. As shown in FIG. 6, a PAN-X 601 and a PAN-Y 602 closely exist.

The PAN-X 601 is composed of a base station-X 603, a terminal station-A 605, a terminal station-B 606, a terminal station-C 607 and a terminal station-F 610, wherein the terminal stations 605–607 and 610 are controlled by the base station-X 603. On the other hand, the PAN-Y 602 is composed of a base station-Y 604, a terminal station-D 608 and a terminal station-E 609, wherein both terminal stations 608 and 609 are controlled by the base station-Y 604.

Moreover, it is supposed that, when both of the terminal station-C 607 and the terminal station-E 609 perform wireless transmission at the same time, both terminals stations 607 and 609 are located at positions where wireless transmission signals of either of them give nonnegligible interference to wireless transmission signals of the other terminal station.

Moreover, it is also supposed that the PAN-X-601 and the PAN-Y 602 are operated independently from each other and are operated in an uncoordinated state to each other.

FIGS. 7A–7D are diagrams illustrating the usage of a frame in the PAN-X 601 at a certain point of time in accordance with the random slot assign method. FIG. 7A shows a channel assignment state in a certain frame. The channel assignment is generally performed by a base station. In this example, a beacon 701, a user assignment area 702 to the terminal station-A 605, a user assignment area 703 to the terminal station-B 606, a user assignment area 704 to the terminal station-F 610, and a contention period 705 are included in the frame. In the user assignment area 704 to the terminal station-F 610, the transmission from the terminal station-F 610 to the terminal station-C 607 is performed.

FIG. 7B is a diagram showing the state in which the information to be transmitted in the user assignment area 704 to the terminal station-F 610 is allocated to a plurality of fragmented slots. The user assignment area 704 corresponds to fragmented slots $706_L$, $706_{L+1}$, $706_{L+2}$, $706_{L+3}$, ..., $706_M$. Incidentally, the character L is supposed to designate a slot number corresponding to the start position of the user assignment area 704, and the character M is supposed to designate a slot number corresponding to the termination position of the user assignment area 704.

The terminal station-F 610 permutates the fragmented slots $706_L$, $706_{L+1}$, $706_{L+2}$, $706_{L+3}$, ..., $706_M$ according to the prescribed slot permutation pattern, and transmits information data at the timing in accordance with the slot permutation pattern. FIG. 7C shows the state in which the terminal station-F 610 transmits transmission data at the timing in accordance with the slot permutation pattern. In the example, the slot $706_L$ in FIG. 7B is transmitted at the timing of the third slot in the frame; the slot $706_{L+1}$ is transmitted at the timing of the seventh slot in the frame; the slot $706_{L+2}$ is transmitted at the timing of the eleventh slot in the frame; the slot $706_{L+3}$ is transmitted at the timing of the fourteenth slot in the frame; ... and the slot $706_M$ is transmitted at the timing of the (N–7)th slot in the frame. In such a way, the slotted data are transmitted at the timing in-accordance with the slot permutation pattern.

The slot permutation pattern is a pattern for arranging slotted data at random in a frame, and is generated by permutating slot numbers by the use of, for example, prescribed random numbers. Moreover, the slot permutation pattern is not necessarily only one, but a plurality of slot permutation patterns may be used. However, it is preferable to grasp in advance that all of the base station and the terminal stations in the same network are made to be random in conformity with a prescribed generation rule, because slots are permutated inclusive of a beacon indicating the head of the frame.

FIG. 7D is a diagram showing not only the state of the user assignment area 704 to the terminal station-F 610 (the resource for communication to the terminal station-C 607), but also the state in which the whole frame, i.e. the beacon 701, the user assignment area 702 to the terminal station-A 605, the user assignment area 703 to the terminal station-B 606 and the contention period 705, are divided into fragmented slots and further the positions of the fragmented slots are rearranged to be transmitted. In the example shown in FIG. 7D, data 707 are one of the data transmitted by the terminal station-A 605 at the timing in accordance with the slot permutation pattern; data 708 are one of the data (a part of the beacon) transmitted by the base station-X 603 at the timing in accordance with the slot permutation pattern; data 709 are one of the data transmitted by the terminal station-F 610 at the timing in accordance with the slot permutation pattern; data 710 are one of the data transmitted by the terminal station-B 606 at the timing in accordance with the slot permutation pattern; and data 711 are one of the data (a part of the data to be transmitted during the contention period) transmitted by any of the terminal stations 605-607 and 610 at the timing in accordance with the slot permutation pattern.

Next, a description is given to the state in which the terminal station-C 607 is subjected to the interference by a transmission signal from the terminal station-E 609 belonging to the other PAN-Y 602 when the terminal station-C 607 receives a signal transmitted from the terminal station-F 610.

Figure 8:
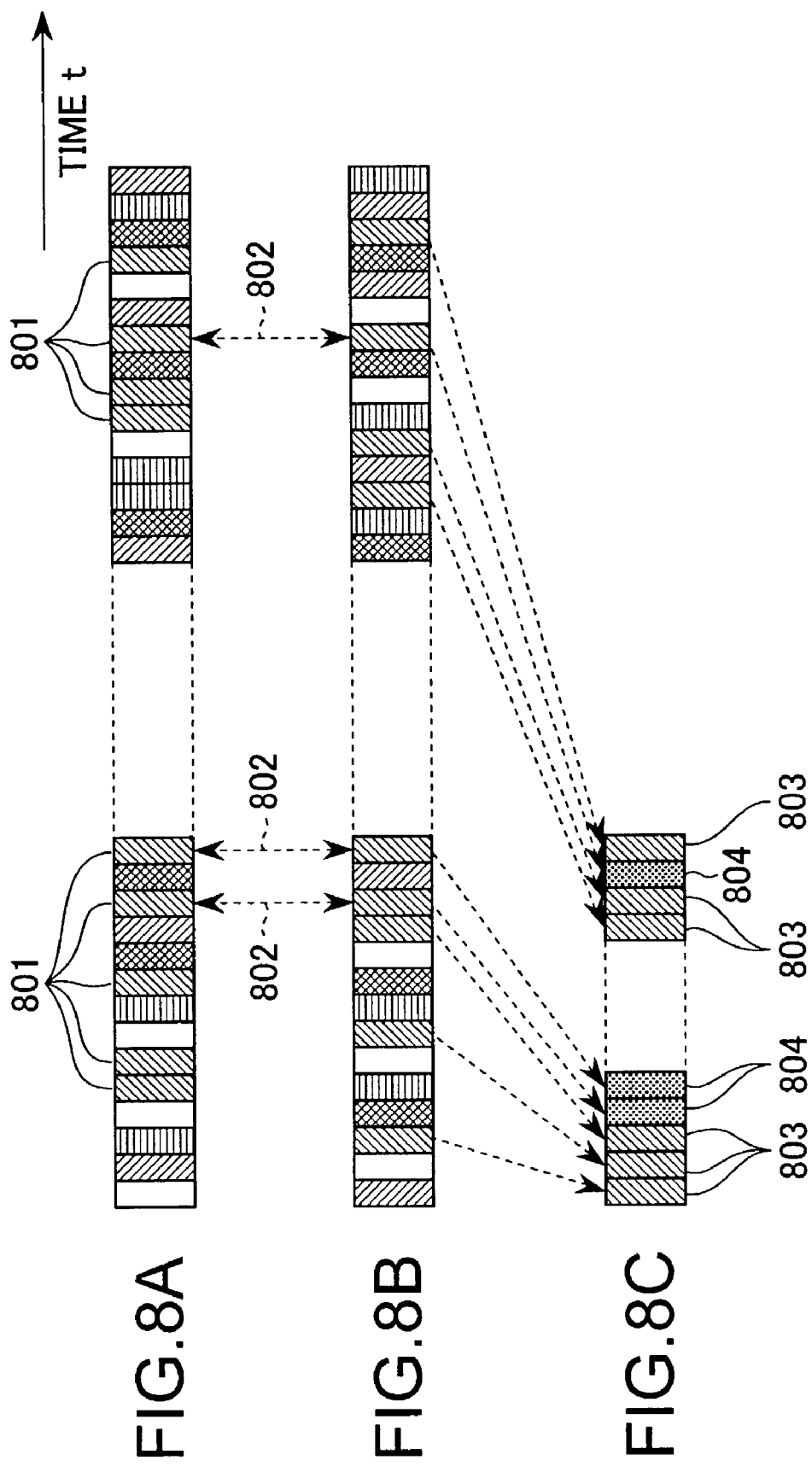
FIG. 8A is a diagram showing a frame concerning a PAN-Y.
FIG. 8B is a diagram showing a frame concerning a PAN-X corresponding to FIG. 7D.
FIG. 8C is a diagram showing a state of slotted data which the terminal station-C receives.

FIG. 8A is a diagram showing a transmission situation of a frame in the PAN-Y 602. In the PAN-Y 602 also, transmission is being performed in the state of permutating data in the frame at random in accordance with the random slot assign method which is quite independent from that for the PAN-X 601. In FIG. 8A, the data to be transmitted by the terminal station-E 609 is designated by a reference numeral 801.

FIG. 8B is a diagram showing a transmission situation of a frame in the PAN-X 601. FIG. 8B is the same as FIG. 7D.

The data 801 transmitted from the terminal station-E 609 interferes with the data reception of the terminal station-C 607 at the timing 802 of the data reception.

FIG. 8C shows a state of the terminal station-C 607 which has collected necessary parts of reception signals received at the timing in accordance with the slot permutation pattern. The collected signals includes parts 803 corresponding to the data being not subjected to the interference by the transmission signal from the terminal station-E 609 and parts 804 corresponding to the data being subjected to the interference by the transmission signal from the terminal station-E 609.

The collected data 803 and 804 are de-interleaved to be restored to the coded data. The restored coded data are decoded by error-correcting, and thereby reception information bits can be obtained.

As described above, because the transmission signals from the terminal station-E 609 which are permutated at random slot positions in the frame by the random slot assign method interfere with the reception signals of the terminal station-C 607 only at a low probability at the time of the reception of the reception signals by the terminal station-C 607, it can be expected that the error produced by the interference can be corrected to be correctly decoded.

[Treatment of Contention Period]

Next, the treatment of a contention period in the random slot assign method is described.

In the case where slots corresponding to a contention period are used, the terminal station using such slots uses a prescribed number (e.g. 8) of continuous slots as the minimum unit. If the continuous slots are used, the slots are arranged randomly in a frame in accordance with a slot permutation pattern in the random slot assign method. Consequently, the data to be transmitted in the contention period also interfere with transmission signals of other stations exemplified in FIG. 8C randomly and partially. Or, the data to be transmitted in the contention period are subjected to random interference by transmission signals from other stations. Consequently, the errors produced by the interference can be expected to be corrected to be decoded correctly.

[About Permutation Method of Slot Permutation]

Next, a permutation method of slots of the random slot assign method in the present embodiment is described. Any permutation method by which random partial interference is given to transmission signals from other stations or random interference is given from transmission signals from other stations may be adopted as the slot permutation method. For example, the following permutation methods can be considered.

0. A method in which one channel in a frame is randomly permutated in the whole frame as shown in FIGS. 7A–7D. The description thereof is omitted.

Figure 9:
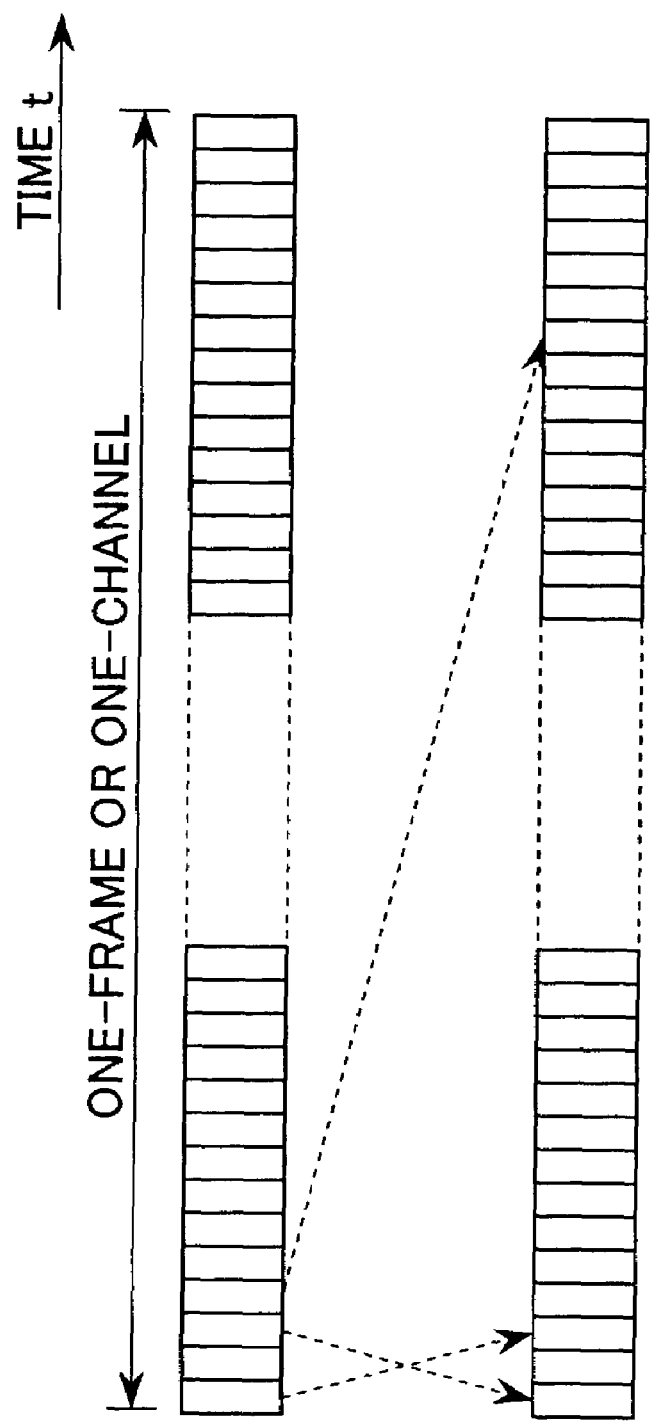
FIG. 9A is a diagram showing the state of a frame in which slots are permutated yet.
FIG. 9B is a diagram showing a state of the frame in which N slots are permutated at random.

1. A method in which N slots from the first to the Nth in a frame or a channel are completely randomly permutated. FIG. 9A shows slots before permutation, and FIG. 9B shows the state in which N slots are randomly permutated.

2. As another permutation method, there is the method in which slots are grouped at first and then the grouped slots are randomly permutated. This method is described with reference to FIGS. 10A–10C.

Figure 10:
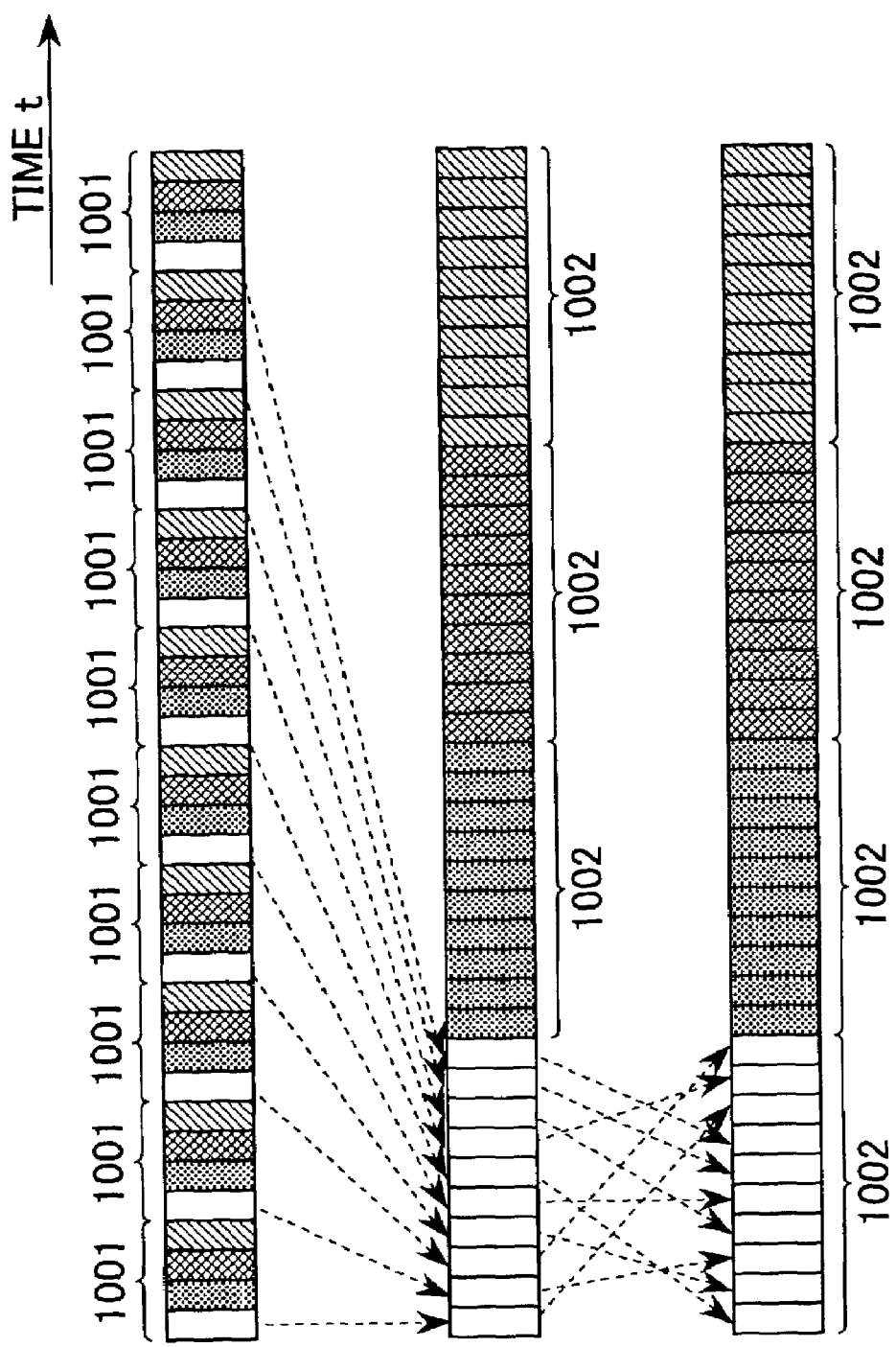
FIG. 10A is a diagram showing a state of a frame composed of N slots in which J continuous slots are selected to be one group.
FIG. 10B is a diagram showing a state of the frame in which a slot in each group is allocated into J slot groups severally.
FIG. 10C is a diagram showing a state of the frame in which J slots is permutated at random in each slot group.

First, as shown in FIG. 10A, in a frame including N slots, J (e.g. J=4) continuous slots are grouped as a group 1001, and then N/J groups are made.

Next, as shown in FIG. 10B, a first slot is selected from each group 1001 severally to be allocated in J slot groups 1002. Each slot group 1002 includes J slots severally.

Lastly, J slots are randomly permutated in each slot group 1002. FIG. 10C shows a state after J slots are randomly permutated in each slot group 1002.

By the permutation method, it is guaranteed that J continuous slots are severally permutated in J blocks (slot groups) in a dispersed state in the frame. As a result, it becomes possible to perform a random and dispersed arrangement in which there is no chance of arranging the slots in a specific area at a part of the frame in a localized manner.

[Permutation Pattern Synchronization Method]

As described above, in the present embodiment, it is preferable that all of the communication equipment (including both of the base station and terminal stations) existing in the same PAN knows the slot permutation pattern or a generation rule for generating the pattern. It is also preferable that the same slot permutation pattern does not appear over many frames for the sake of an object for making the contention with communication equipment of other networks to be random.

Figure 11:
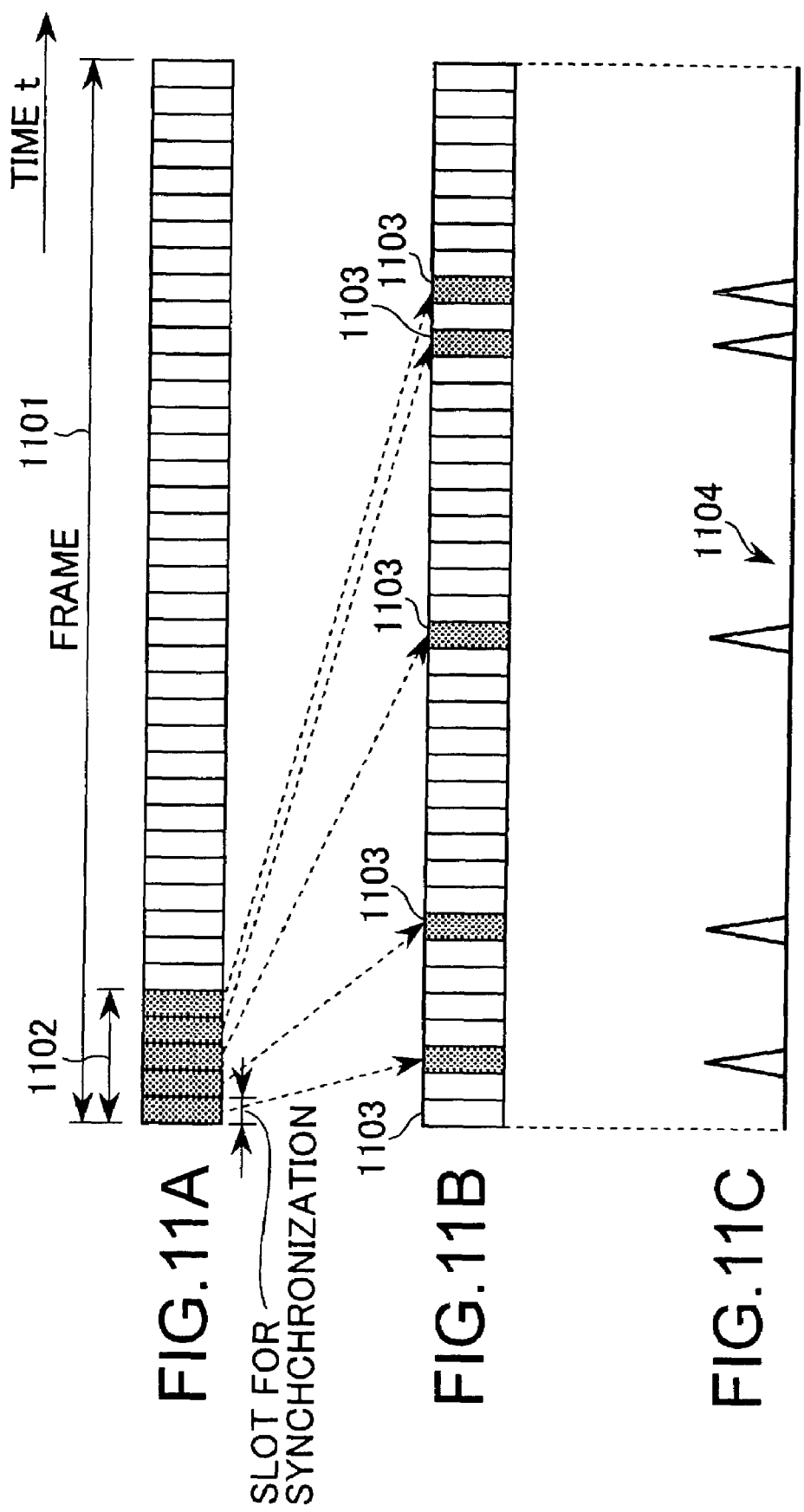
FIG. 11A is a diagram showing a frame including a synchronization pattern.
FIG. 11B is a diagram showing a state of the frame in which synchronous slots are permutated according to a slot permutation pattern.
FIG. 11C is a diagram showing an output waveform of a correlator corresponding to the synchronous slot.

First, as shown in FIG. 11A, the base station transmits a pattern for synchronization as a part of the beacon transmitted at every frame 1101. However, although the terminal stations can grasp the slot permutation pattern or its generation rule used by the base station, the terminal stations cannot know which portion of the slot permutation pattern is now transmitted in the initial state (at the time immediately after the turning on of power source or the like).

Accordingly, a pre-determined pattern for synchronization for acquiring the permutation pattern synchronization (e.g. a synchronization word having a length equal to the length of a fragmented slot) is previously determined, and the pre-determined pattern is previously stored in each communication equipment. A plurality of slots including the pattern for synchronization is prepared (1102). When these slots including the signal trains (called as synchronous slots) 1103 are transmitted, the slots are made to be arranged at random positions in the frame according to a slot permutation pattern in accordance with the random slot assign method (see FIG. 11B).

On the terminal station sides, the correlator (406 in FIG. 4) corresponding to the pre-determined pattern for synchronization for acquiring the permutation pattern synchronization, which is included in the synchronous slots 1103, is used for the detection and the specification of positions of the synchronous slots. FIG. 11C is a waveform diagram showing an output signal 1104 of such a correlator. The output signal 1104 takes correlation peaks in accordance with the positions of the synchronous slots. Thus, the terminal stations detect individual synchronous slots first. Next, the terminal stations detect the pre-determined pattern for synchronization, and then the terminal stations store the position pattern of detected synchronous slots.

The position of the slot permutation pattern being transmitted now is specified by the comparison of the position pattern of the detected synchronous slots with the slot permutation pattern.

Thereby, the terminal stations find the position of the slot permutation pattern being transmitted. After that, the terminal stations independently generate the slot permutation pattern by the use of the stored slot permutation pattern or its generation rule. And thereby, the terminal stations can synchronize with the slot permutation pattern used by the base station.

Moreover, in the present method, the fact that the terminal stations can synchronize with slot permutation pattern without any contradiction means that the terminal stations have synchronized with the delimiters of frames, and thereby frame synchronization can also be achieved at the same time.

[Another Constructional Example of Pre-Determined Pattern for Synchronization]

The signal train having the same length as the slot length is used as the above-mentioned pattern for synchronization. However, it is also considerable that the pattern for synchronization is structured by the use of the repetition of a synchronization word having the length shorter than the slot length. In the case where the slot length is not integer multiple of the length of the synchronization word, the repetition of regularly arranged synchronization words is used.

Figure 12:
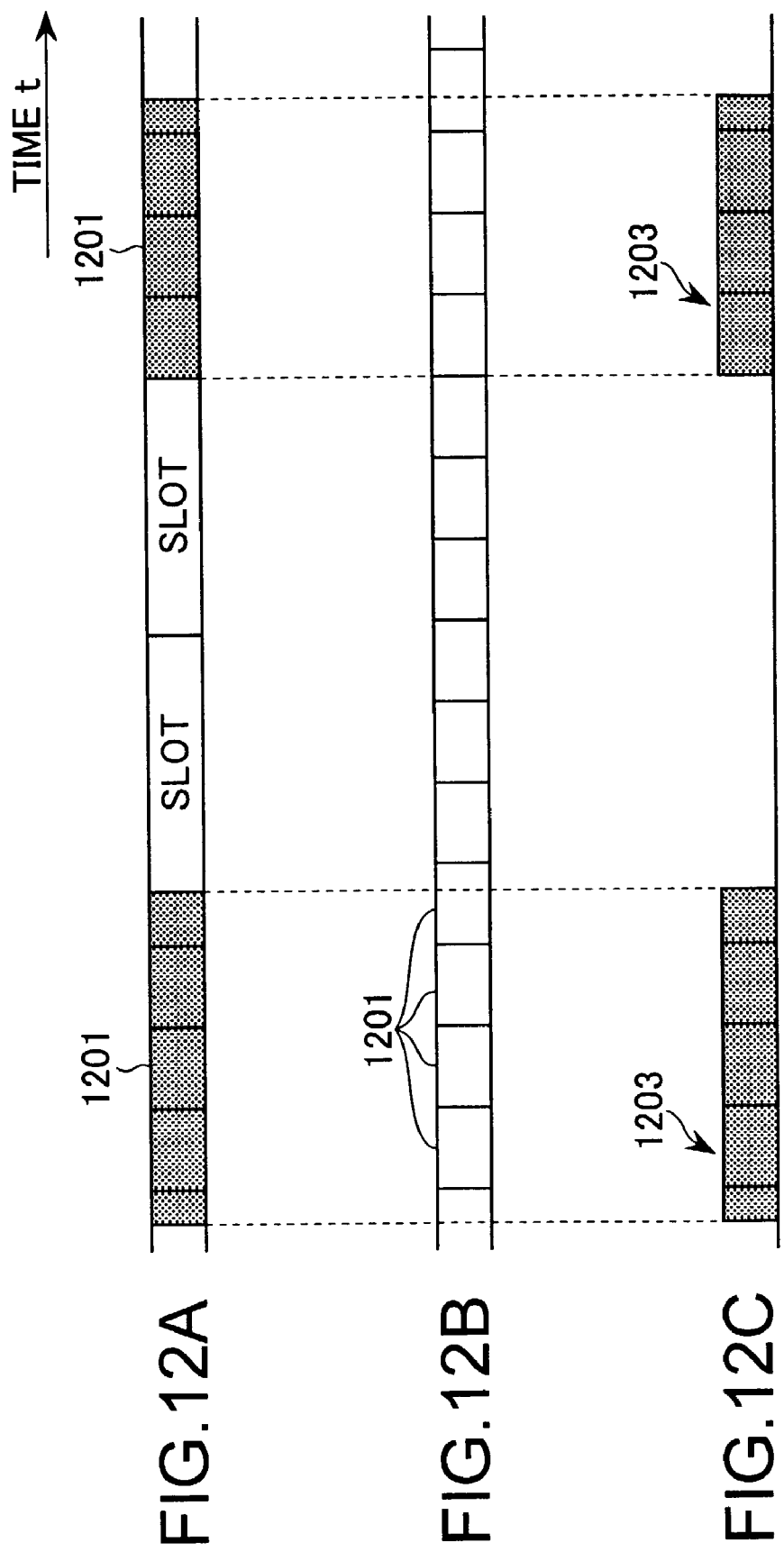
FIG. 12A is a diagram showing a state of a part of a frame in which synchronous slots are arranged.
FIG. 12B is a diagram showing a state of the part in which synchronization words are repeatedly generated.
FIG. 12C is a diagram showing a state of the part in which fetched window synchronization words 1203 are transmitted at the timing corresponding to the synchronous slots.
Figure 13:
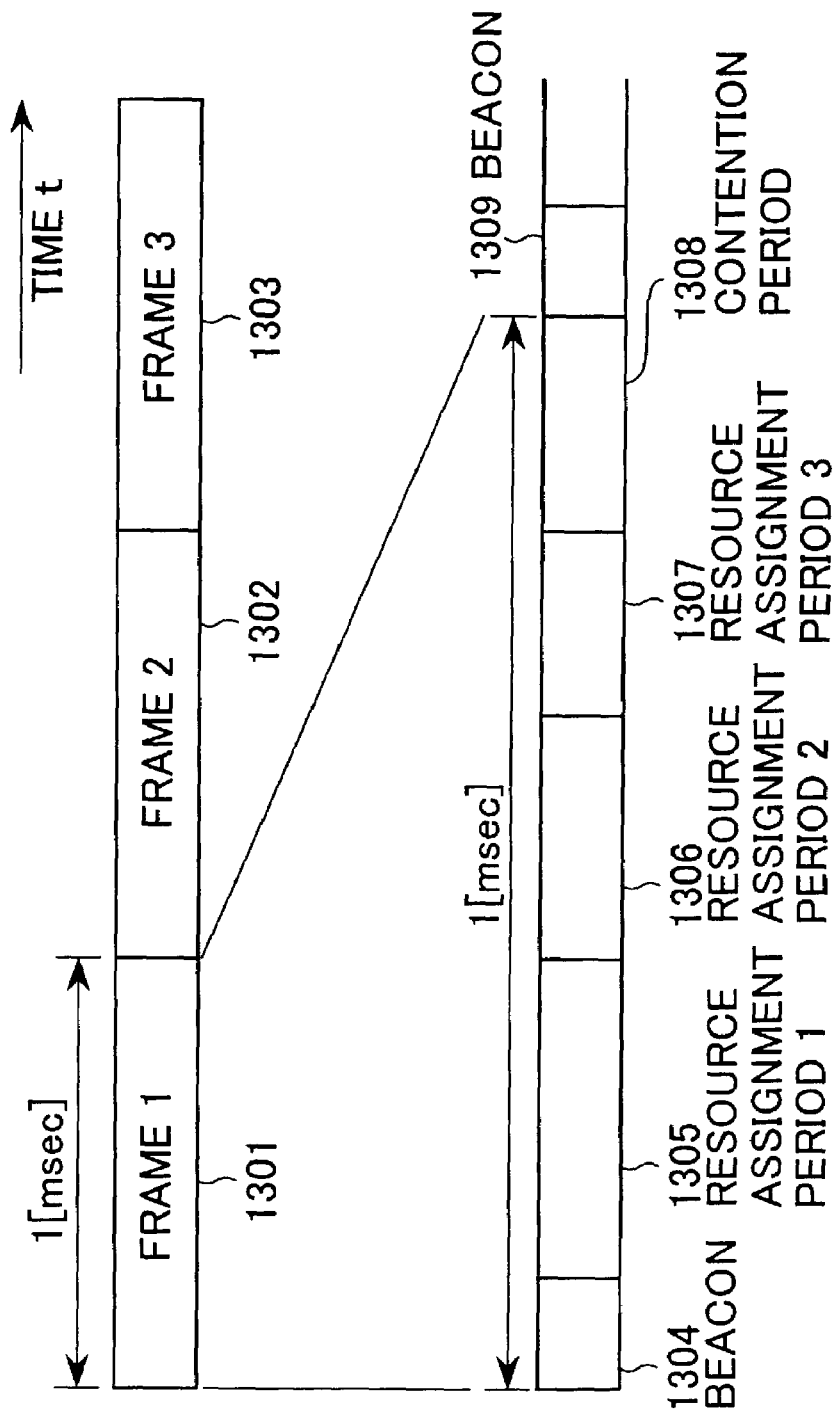
FIG. 13A is a diagram showing conventional TDMA frames.
FIG. 13B is a diagram showing a constructional example of a conventional TDMA frame.
Figure 14:
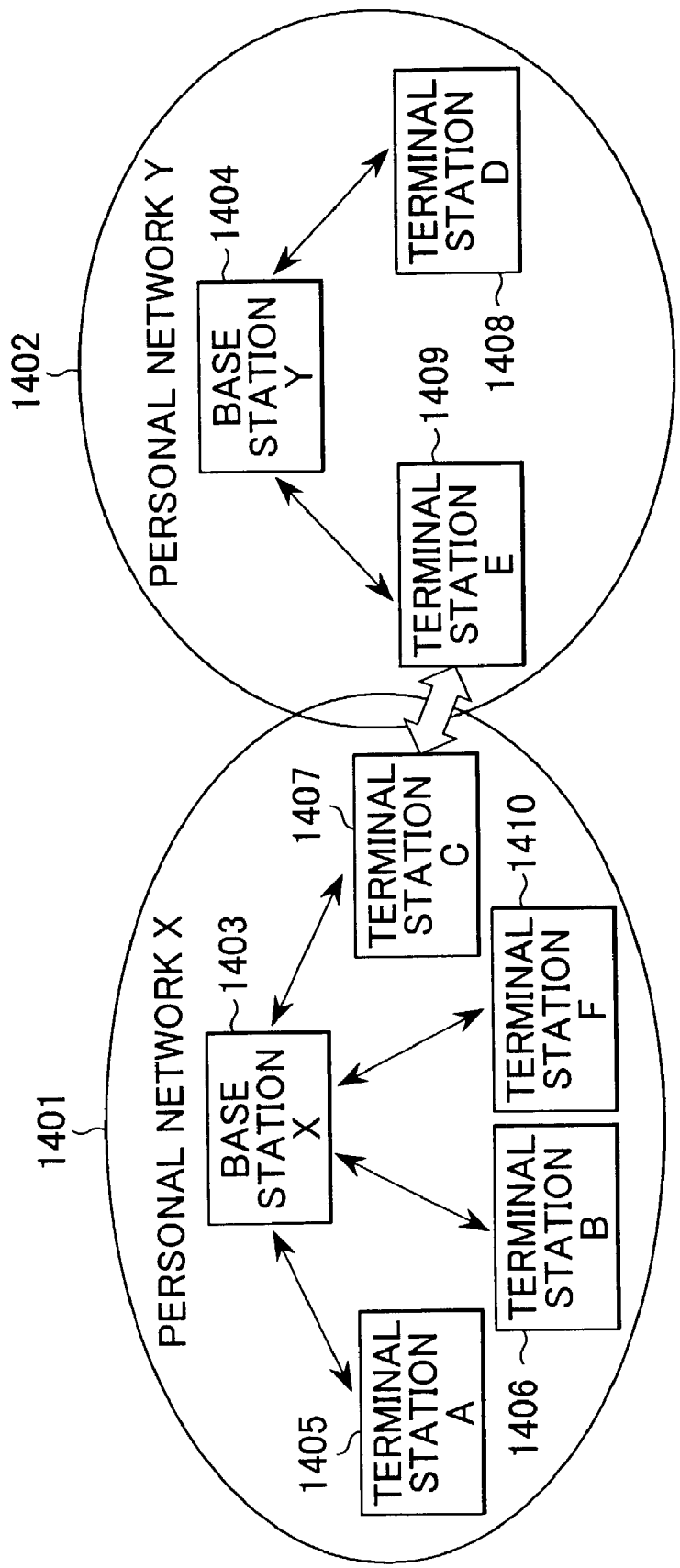
FIG. 14 is a diagram showing a state in which two networks are arranged closely to each other.
Figures 15A, 15B:
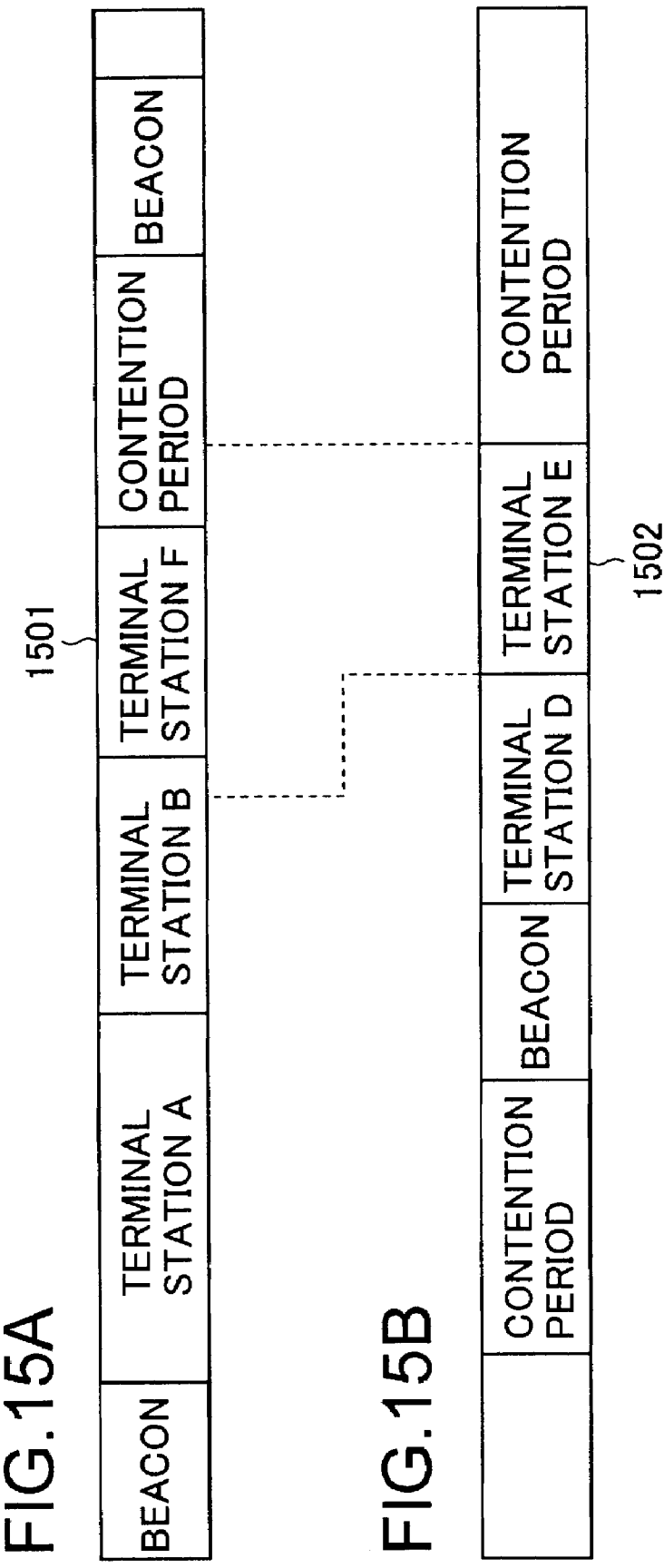
FIG. 15A is a diagram showing a frame structure in the network-X in FIG. 14.
FIG. 15B is a diagram showing a frame structure in the network-Y in FIG. 14.

FIGS. 12A–12C show an example of the pattern for synchronization using the repetition of a regularly arranged synchronization words.

FIG. 12A is a diagram showing the state in which synchronous slots 1201 are arranged in a certain frame.

The base station repeatedly generates synchronization words 1202 having the length shorter than the lengths of the synchronous slots 1201. FIG. 12B is a diagram showing the state in which the synchronization word 1202 is repeatedly generated.

The base station obtains words (window synchronization word) 1203 fetched from the repeatedly generated synchronization words 1202 by means of the synchronous slots 1201 as windows, and the base station transmits the obtained words. FIG. 12C shows the state in which the fetched window synchronization words 1203 are transmitted at the timing according to the synchronous slots.

On the reception side, the correlation to the synchronization word is obtained. If the first correlation can be obtained, it becomes possible to be synchronized with the synchronization words to be received after the settlement of the first correlation by the use of a counter cycling the period of the synchronization word (word length).

By the use of the synchronization method being constructed as above, the restrictions of the relation between the synchronization word and the slot length can be decreased, and the degree of freedom concerning the selection of the synchronization word and the setting of the slot length can be increased.

[Variations]

Although de-interleaving and coding are performed in the above-mentioned embodiment, in the present variation, the transmission data from a station on the transmission side may not be coded in the communication in which the production of data errors owing to interference can be permitted, though the coding is performed for making the interference given to a reception side to be random.

Moreover, in another variation, both of the de-interleaving and the coding may be omitted.

[The Other Variations]

Although the CPU functioning as the central controlling section executes processing on the basis of programs stored in the EEPROM in the above-mentioned constructional examples of the transmitting apparatus and the receiving apparatus, the scope of the present invention is not limited to such a form, and such controls may be performed by the transmitting apparatus and the receiving apparatus by installing a program recording medium in which the program is recorded into the transmission apparatus and the receiving apparatus.

Such a program recording medium may be not only a package medium such as a floppy disk, a CD-ROM and a DVD, but also may be a semiconductor disk and a magnetic disk which store the program temporarily or eternally. Moreover, as means for storing the program in these program recording media, wired or wireless communication means such as a local area network, the Internet and a digital communication satellite may be used for downloading the program to write the downloaded program into a program recording medium. Or, communication equipment such as a router and a modem may be interposed for storing the program.

Although the invention has been described in its preferred form with a certain degree of particularity, obviously many changes and variations are possible therein. It is therefore to be understood that the present invention may be practiced than as specifically described herein without departing from scope and the sprit thereof.

What is claimed is:

1. A wireless communication system for performing wireless communication by use of a time-division frame having a prescribed period in each network among existing two or more networks uncoordinated to each other, wherein:
   said time-division frame is composed of a plurality of fragmented slots; and
   each wireless communication networks permutates said fragmented slots corresponding to areas assigned by a base station for performing transmission in an order in accordance with a prescribed slot permutation pattern, and performs wireless transmission by use of said permutated fragmented slots,
   wherein a number of said fragmented slots corresponding to said areas assigned by said base station is N; and
   said slot permutation pattern is made for permutating each fragmented slot by grouping said N fragmented slots at every J continuous fragmented slots to N/J groups, and by allotting said fragmented slots one by one from each group to J slot groups.

2. The wireless communication system according to claim 1, wherein:
   said slot permutation pattern is made for permutating said fragmented slots randomly in a whole area of said time-division frame.

3. The wireless communication system according to claim 1, wherein: said time-division frame includes a contention period; and when each wireless communication networks performs wireless communication by use of said contention period, a plurality of continuous fragmented slots are assigned as a transmission area, and then said plurality of continuous fragmented slots are permutated in an order in accordance with said prescribed slot permutation pattern.

4. The wireless communication system according to claim 1, wherein:
   there are a plurality of synchronous slots including a prescribed synchronous pattern for obtaining synchronization of said slot permutation pattern in said time-division frame.

5. The wireless communication system according to claim 4, wherein:
   said prescribed synchronous pattern has a length same as lengths of said synchronous slots.

6. The wireless communication system according to claim 4, wherein:
   said prescribed synchronous pattern has a length shorter than lengths of said synchronous slots; and
   said synchronous slots are composed of repetitions of said prescribed synchronous pattern.

7. The wireless communication system according to claim 4, wherein:

lengths of said synchronous slots are not integer multiple of a length of said synchronous pattern; and window synchronization words fetched from repeatedly generated patterns for synchronization by means of said synchronous slots as windows are transmitted as said synchronous slots.

8. A transmitting apparatus for performing wireless communication by use of a time-division frame having a prescribed period in a circumstance where two or more networks exist with being uncoordinated to each other, said time-division frame being composed of a plurality of fragmented slots, said transmitting apparatus comprising: slot permutation controlling means for controlling said fragmented slots corresponding to areas assigned by a base station for performing transmission to be permuted in an order in accordance with a prescribed slot permutation pattern; slot permutating means for permutating said fragmented slots in accordance with a control by said slot permutation controlling means; transmission timing controlling means for controlling transmitting means so as to transmit said permutated fragmented slots at timing in accordance with said prescribed slot permutation pattern; and transmitting means for performing the wireless communication at timing controlled by said transmission timing controlling means, wherein a number of said fragmented slots corresponding to said areas assigned by said base station is N: and said slot permutation pattern is made for permutating each fragmented slot by grouping said N fragmented slots at every J continuous fragmented slots to N/J groups, and by allotting said fragmented slots one by one from each group to J slot groups.

9. The transmitting apparatus according to claim 8, wherein:

said slot permutation pattern is made for permutating said fragmented slots randomly in a whole area of said time-division frame.

10. The transmitting apparatus according to claim 8, wherein:

there are a plurality of synchronous slots including a prescribed synchronous pattern for obtaining synchronization of said slot permutation pattern in said time-division frame.

11. A receiving apparatus for performing wireless communication by use of a time-division frame having a prescribed period in a circumstance where two or more networks exist with being uncoordinated to each other, said receiving apparatus comprising:

receiving means for receiving a wireless signal to demodulate the received wireless signal;

reception timing controlling means for controlling said receiving means to demodulate parts corresponding to necessary fragmented slots in received wireless signal at prescribed timing by use of a slot permutation pattern used by a transmitting apparatus;

slot permutation controlling means for controlling to de-permutate said fragmented slots in accordance with said slot permutation pattern used by said transmitting apparatus; and slot permutating means for permutating said fragmented slots in accordance with a control by said slot permutation controlling means, wherein a number of said fragmented slots corresponding to said areas assigned by said base station is N; and said slot permutation pattern is made for permutating each fragmented slot by grouping said N fragmented slots at every J continuous fragmented slots to N/J groups, and by allotting said fragmented slots one by one from each group to J slot groups.

12. The receiving apparatus according to claim 11, said receiving apparatus further comprising:

correlation detecting means for detecting a prescribed synchronous pattern for obtaining synchronization of said slot permutation pattern.

13. The receiving apparatus according to claim 11, said receiving apparatus further comprising:

error correcting means for correcting an error of reception data de-permutated by said slot permutating means.

14. A wireless transmission method for performing wireless communication by use of a time-division frame having a prescribed period in a circumstance where two or more networks exist with being uncoordinated to each other, said time-division frame being composed of a plurality of fragmented slots, said wireless transmission method comprising the steps of:

permutating said fragmented slots corresponding to areas assigned by a base station for performing transmission in an order in accordance with a prescribed slot permutation pattern; and transmitting said permutated fragmented slots at timing in accordance with said prescribed slot permutation pattern, wherein a number of said fragmented slots corresponding to said areas assigned by said base station is N; and said slot permutation pattern is made for permutating each fragmented slot by grouping said N fragmented slots at every J continuous fragmented slots to N/J groups, and by allotting said fragmented slots one by one from each group to J slot groups.

15. The wireless transmission method according to claim 14, wherein said slot permutation pattern is made for permutating said fragmented slots randomly in a whole area of said time-division frame.

16. A wireless reception method for performing wireless communication by use of a time-division frame having a prescribed period in a circumstance where two or more networks exist with being uncoordinated to each other, said wireless reception method comprising the steps of:

receiving a wireless signal at timing in accordance with a prescribed slot permutation pattern; and de-permutating fragmented slots in accordance with a slot permutation pattern used by a transmitting apparatus, wherein a number of said fragmented slots corresponding to said areas assigned by said base station is N; and said slot permutation pattern is made for permutating each fragmented slot by grouping said N fragmented slots at every J continuous fragmented slots to N/J groups, and by allotting said fragmented slots one by one from each group to J slot groups.

17. The wireless reception method according to claim 16, said wireless reception method further comprising the step of:

detecting a prescribed synchronous pattern for obtaining synchronization of said slot permutation pattern.

* * * * *

UNITED STATES PATENT AND TRADEMARK OFFICE
CERTIFICATE OF CORRECTION

PATENT NO. : 7,227,852 B2 Page 1 of 1
APPLICATION NO. : 10/247703
DATED : June 5, 2007
INVENTOR(S) : Mitsuhiro Suzuki It is certified that error appears in the above-identified patent and that said Letters Patent is hereby corrected as shown below:

Column 16, line 26, change "networks" to --apparatus--.

Signed and Sealed this

Eighth Day of July, 2008

JON W. DUDAS
*Director of the United States Patent and Trademark Office*